Dec. 8, 1942.   E. McCORMICK   2,304,365
TRACTOR
Filed June 27, 1940   2 Sheets-Sheet 1
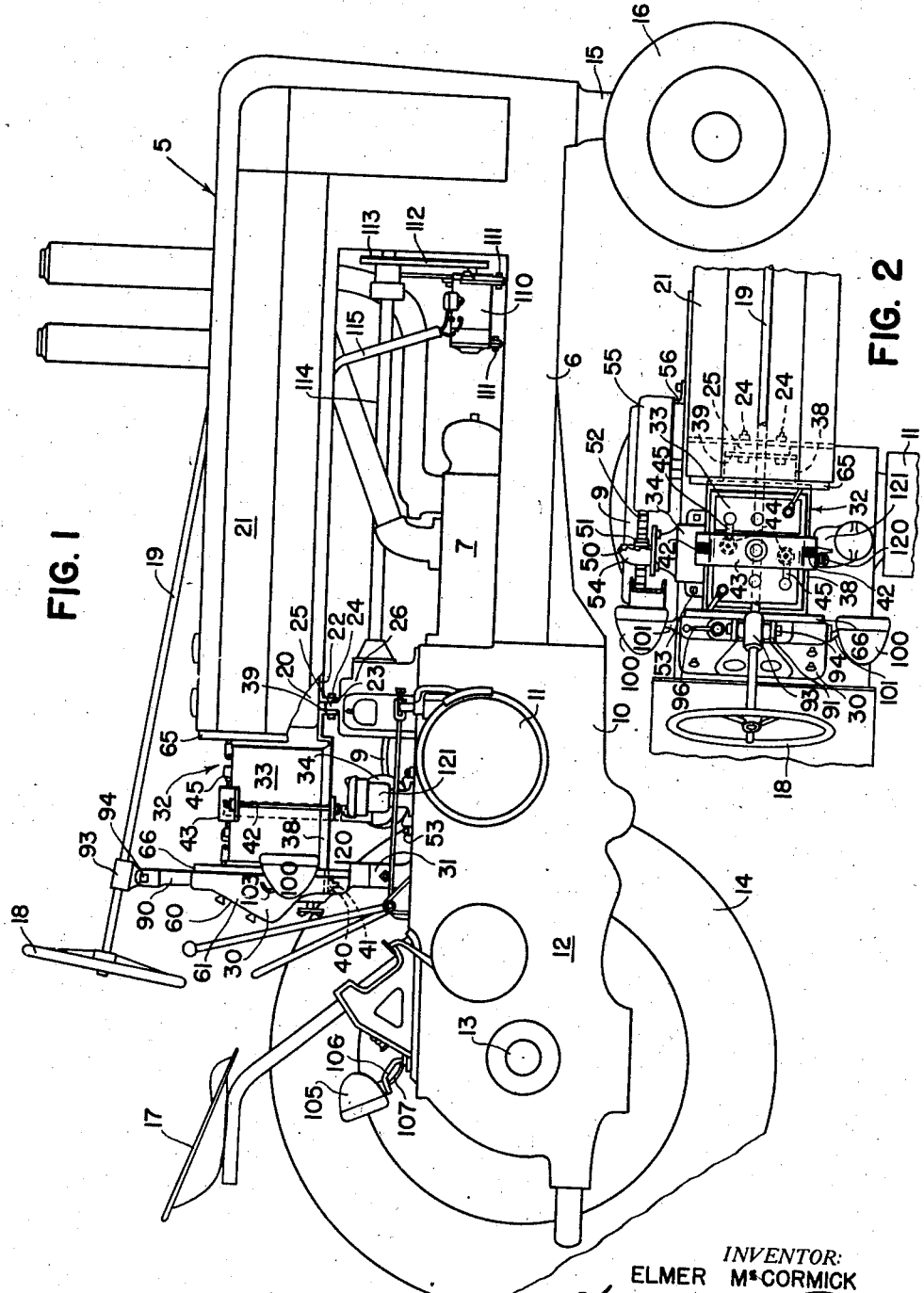
INVENTOR:
ELMER McCORMICK
BY
ATTORNEYS.

Dec. 8, 1942.  E. McCORMICK  2,304,365
TRACTOR
Filed June 27, 1940  2 Sheets-Sheet 2
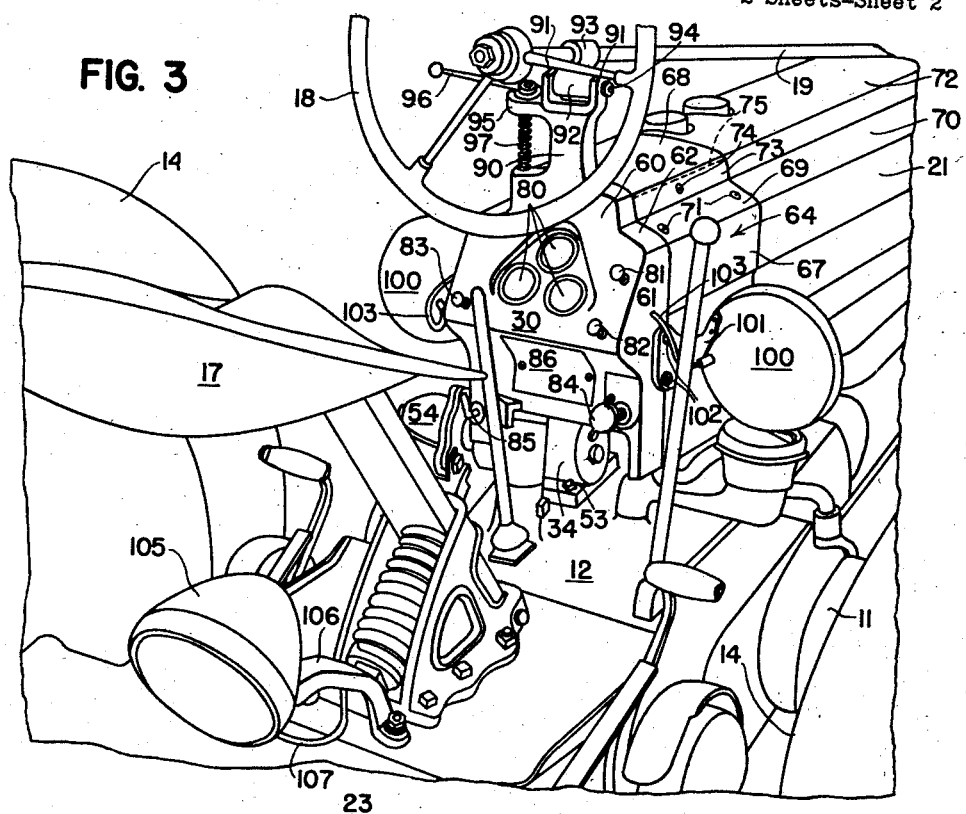
FIG. 3
FIG. 4
INVENTOR:
ELMER McCORMICK
BY 
ATTORNEYS.

Patented Dec. 8, 1942

2,304,365

UNITED STATES PATENT OFFICE 2,304,365

TRACTOR

Elmer McCormick, Waterloo, Iowa, assignor to John Deere Tractor Company, Waterloo, Iowa, a corporation of Iowa Application June 27, 1940, Serial No. 342,672

9 Claims. (Cl. 180—1)

The present invention relates generally to electrical equipment for vehicles and more particularly to tractors, and has for its principal object the provision of electric starting and lighting equipment for vehicles of this class. More specifically, it is an object of this invention to provide a convenient arrangement and means for mounting a storage battery, starting, lighting and control equipment on a farm tractor or similar vehicle without appreciably obstructing the operator's view of the ground ahead of and at the sides of the tractor. In farm tractors, especially, it is important that the operator should have a clear and unobstructed view of ground working tools mounted at the forward end of the tractor, such as, for instance, tractor-mounted cultivators or planting equipment.

These and other objects and advantages of the present invention will be apparent to those skilled in the art after a consideration of the following description, in which reference is had to the drawings appended hereto, in which—

Figure 1 is a side elevation of a tractor embodying the principles of this invention, with the battery enclosure removed, and also one of the rear wheels of the tractor to more clearly show the various elements of this invention;

Figure 2 is a plan view of a portion of the tractor shown in Figure 1, showing the battery compartment with the cover removed;

Figure 3 is a perspective view showing the control panel and battery compartment with the enclosure in place; and Figure 4 is a fragmentary side elevation showing the connection between the starting motor and the flywheel.

Referring now to the drawings, the tractor, indicated in its entirety by reference numeral 5, comprises a narrow longitudinally extending body or frame 6 including an engine 7 of the type having horizontally disposed cylinders connected to a transversely disposed crank shaft 8 behind the latter, as indicated in Figure 4. One end of the crank shaft 8 extends laterally out of the crank case 10 and supports a flywheel 9 mounted rigidly thereon. The opposite end of the crank shaft is connected through suitable clutch mechanism 11 to transmission gearing (not shown) mounted in a longitudinally extending gear housing 12 disposed behind the crank case 10 and through which the engine is operatively connected to drive the rear axle 13 of the tractor 5. A pair of rear traction wheels 14 are mounted on the axle 13 and support the rear end of the tractor. The forward end of the tractor frame 6 is mounted on a steering post 15 carried on dirigible front wheels 16, controlled from the tractor seat 17 by a steering wheel 18 connected thereto through a forwardly extending steering shaft 19. A longitudinally extending fuel tank 20 is mounted above the engine 7 and is covered by a longitudinally extending housing 21, the tank and housing being supported on a shelf member 22, the rear end of which has a downwardly turned flange 23 connected by bolts 24 to a lug 25 on the top of the governor housing 26. The tractor described thus far is conventional and well known to those skilled in the art.

In accordance with the teachings of the present invention, a control and instrument panel 30 is spaced rearwardly from the fuel tank 20 and is rigidly and independently supported on a pedestal 31 fixed on the top of the transmission housing 12 of the tractor and thus providing a space for a compartment 32 for electrical equipment, such as a battery 33 and a starting motor 34.

The battery 33 is supported on a shelf 38, which extends longitudinally of the tractor within the battery compartment 32 and has a downwardly turned flange 39 at its forward end. This flange 39 is supported on the bolts 24, which extend through aligned apertures in the flanges 39 and 23, and the lug 25 on the top of the governor housing 26. The rear end of the shelf 38 is supported on a ledge 40 fixed to the back of the control panel 30, and is fixed thereto by suitable bolts 41 (see Figure 1). The battery 33 is secured to the shelf 38 by means of a pair of vertically disposed clamping bolts 42 engaging the shelf 38 at their lower ends and attached to a transversely extending clamping plate 43 at their upper ends. The clamping plate 43 extends across the top of the battery 33 and has a pair of laterally spaced rubber pads, indicated at 44 in Figure 2, which bear upon the top of the battery and serve, not only as a cushion between the plate 43 and the battery, but also as an insulator to prevent contact between the plate 43 and the battery terminals 45.

The starting motor 34 is disposed beneath the battery shelf 38 and extends laterally from one side of the battery housing to establish a mechanical connection with the flywheel 9. The shaft 50 of the starting motor is provided with a pinion 51, which meshes during starting with a ring gear 52 extending around the circumference of the flywheel 9 and fixed thereto. The starting motor is rigidly bolted by bolts 53 to the top of the transmission housing 12. A curved safety guard 54 embraces the upper portion of the motor pinion 51 and an annular safety guard 55 extends around the circumference of the flywheel and prevents accidental contact with the ring gear 52. The annular safety guard 55 is supported on the tractor frame by means of suitable brackets 56.

The control panel 30 is in the form of a hollow casting having an obliquely extending face 60, a pair of vertical side walls 61, and a top wall 62. The side and top walls 61, 62 are disposed in alignment with the side and top surfaces of the fuel tank housing 21, as best seen in Figure 3, and supported between the fuel tank housing 21 and the control panel 30 is a battery enclosure 64. The enclosure 64 is supported on recessed supporting ledges 65, 66 on the fuel tank housing 21 and control panel 30, respectively, so that the battery enclosure 64 is, in effect, a rearward extension of the fuel tank housing 21, between the rear end of the fuel tank 20 and the control panel 30.

As best indicated in Figure 3, the battery enclosure 64 is formed in three sections, a pair of side sections 67 and a top section 68. The side sections 67 include vertical side wall portions which bend inwardly, as indicated at 69, to conform with the lower level side portions 70 of the top of the fuel tank housing 21, and are detachably bolted thereto by suitable screws 71. The top portion 68 of the battery enclosure conforms with the center ridge 72 of the fuel tank housing 21 and has a pair of longitudinally extending vertically disposed side flanges 73 secured by screws 74 to a pair of upwardly extending flanges 75 along the upper edges of the side enclosures 67.

The face 60 of the control panel 30 supports various instruments 80 and control equipment, such as the starting switch 81, lighting switch 82, choke control 83, carburetor adjusting screw 84 and fuel valve handle 85. The instruments 80 include the ammeter, the temperature gauge and the oil gauge. The hollow control panel provides room for the instrument supports, wiring, switches, and fuses, and access thereto is obtained through a removable plate 86 in the lower portion of the panel face.

A steering wheel supporting standard 90 rises from the top of the instrument panel 30 and is preferably formed integral therewith, the upper end of the standard 90 being bifurcated at 91 to receive the supporting block 92 of the steering rod bearing 93, and the bearing 93 is attached to the bifurcated end 91 by a bolt 94. A lug 95 extends laterally from the upper end of the standard 90 and supports the throttle arm 96 which is fixed to a vertically extending control rod 97 extending downwardly through the hollow panel 30 and is operatively connected at its lower ends by means (not shown) to the governor of the tractor.

A pair of head lights 100 are disposed on opposite sides of the control panel 30 and are supported on brackets 101 which are fixed by bolts 102 to the vertical side walls 61 of the instrument panel 30. Wires 103 connect the head lights with the control switch 82. A rearwardly directed light 105 is supported on a bracket 106 which is fixed by bolts 107 to the top of the transmission housing 12 beneath the seat 17 and is connected with the light switch 82 by means of suitable wires 107. The light 105 is provided for the purpose of illuminating an implement drawn behind the tractor. The battery 33 is charged by means of a generator 110, which is rigidly mounted by means of bolts 111 on the tractor frame 6. The generator 110 is driven by means of a belt 112 which passes over a suitable pulley 113 fixed to the fan shaft 114 of the tractor. A cable 115 extends from the generator 110 upwardly into the fuel tank housing 21, through which it extends rearwardly to the battery compartment 32 and the control panel 30.

The battery compartment 32 also serves to enclose and protect the breather tube 120, which extends upwardly from the oil inlet pipe 121 through which the lubricating oil is poured into the crank case 10.

It is to be noted that according to the principles of this invention the various pieces of electrical equipment have been effectively arranged and housed so that the operator's view of the ground ahead of and on each side of the tractor is unimpaired and the tractor thus equipped presents an attractive and pleasing appearance.

It is to be understood that the present invention is not to be limited to the exact details shown and described herein except as limited by the claims which follow.

I claim:

1. In a vehicle comprising a wheel supported frame and a motive power unit mounted at the forward end of the latter, a housing disposed above said unit, front and rear supports for said housing carried on said frame, a panel disposed behind the rear end of said housing in spaced relation thereto, a support for said panel mounted on said frame, a shelf for auxiliary equipment supported at opposite ends thereof on said panel support and on said rear housing support, respectively, and a detachable enclosure for said shelf attached between said housing and said panel.

2. In a tractor having a wheel supported frame, an engine mounted on the forward end thereof, a transmission housing disposed behind said engine and fixed thereto, and a fuel tank disposed above said engine and extending longitudinally thereof, the combination of a longitudinally extending housing enclosing said fuel tank, means serving as a rearward extension of said housing to define a compartment for electrical equipment, means for supporting the rear end of said housing on said transmission housing, and a control panel on the rear end of said electrical compartment.

3. In a vehicle comprising a wheel supported frame, an engine mounted at the forward end thereof and a longitudinally extending fuel tank disposed above said engine, the combination of a longitudinally extending housing for said tank, a control panel spaced rearwardly of said tank housing and rigidly mounted on said vehicle independent of said housing, a battery disposed between said fuel tank and said control panel, supporting means therefor, a detachable enclosure for said battery forming an extension of said fuel tank housing and means for securing said enclosure at opposite ends thereof to said housing and said panel, respectively.

4. In a vehicle comprising a wheel supported frame, an engine mounted at the forward end thereof and a longitudinally extending fuel tank disposed above said engine, the combination of a longitudinally extending housing for said tank, front and rear supports for said housing, a control panel spaced rearwardly of said tank housing, a standard rigidly mounted on the vehicle behind said rear housing support for supporting said control panel, a battery supporting shelf carried on said panel support between the latter and said fuel tank, and a battery enclosure detachably secured at opposite ends thereof to said tank housing and to said control panel and forming a substantially unbroken extension of said tank housing.

5. In a vehicle comprising a wheel supported frame, an engine mounted at the forward end thereof and a longitudinally extending fuel tank disposed above said engine, the combination of a longitudinally extending housing for said tank, an instrument housing spaced rearwardly of said tank housing and having top and sides disposed in longitudinal alignment with the top and sides of said fuel tank housing, respectively, means for supporting said instrument housing on said vehicle, a battery disposed in the space between said tank and instrument housings, a battery enclosure extending between said last named housings and forming a substantially smooth continuation of said top and sides thereof, said enclosure being removable to provide access to the battery, and means for detachably securing the ends of said enclosure to said housings, respectively.

6. In a vehicle comprising a wheel supported frame, an engine mounted at the forward end thereof and a longitudinally extending fuel tank disposed above said engine, the combination of a longitudinally extending housing for said tank, a control panel spaced rearwardly of said tank housing, means supporting said panel on said frame, a shaft journaled on said control panel and extending forwardly therefrom, a steering wheel on said shaft, a battery disposed between said tank and said panel, and a detachable enclosure for said battery between said tank housing and said control panel.

7. In a vehicle comprising a wheel supported frame, a motive power unit mounted at the forward end thereof and a longitudinally extending fuel tank disposed above said engine, the combination of a longitudinally extending housing for said tank, a control panel spaced rearwardly of said tank housing, means supporting said panel on said frame, a shaft journaled on said control panel and extending forwardly therefrom, a steering wheel on said shaft, a battery shelf disposed between said tank and said panel and spaced above said motive power unit to provide a starting motor compartment below the shelf, and a detachable enclosure over said battery between said tank housing and said control panel.

8. In a vehicle comprising a wheel supported frame, an engine mounted at the forward end thereof and a longitudinally extending fuel tank disposed above said engine, the combination of a longitudinally extending housing for said tank, a control panel spaced rearwardly of said tank housing and rigidly supported on the vehicle, a battery supporting shelf disposed between said fuel tank and said control panel, a detachable enclosure disposed over said battery shelf between said fuel tank housing and said control panel and forming a substantially smooth continuation of the top and sides of said tank housing, a pedestal mounted on said panel and extending upwardly therefrom, and a steering shaft journaled on said pedestal and extending forwardly above said detachable enclosure.

9. In a vehicle comprising a wheel supported frame and a motive power unit mounted thereon, a fuel tank disposed longitudinally above said unit, a housing closely embracing said fuel tank, front and rear supports for said tank and housing on said frame, a control panel disposed behind the rear end of said housing in spaced relation thereto, a support for said panel mounted on said frame behind said rear housing support, a shelf for auxiliary equipment supported at opposite ends thereof on said panel support and on said rear housing support, respectively, and spaced above said motive power unit to define a starting motor compartment therebetween, and a detachable enclosure above said shelf attached between said housing and said panel.

ELMER McCORMICK.